Patented Sept. 6, 1932

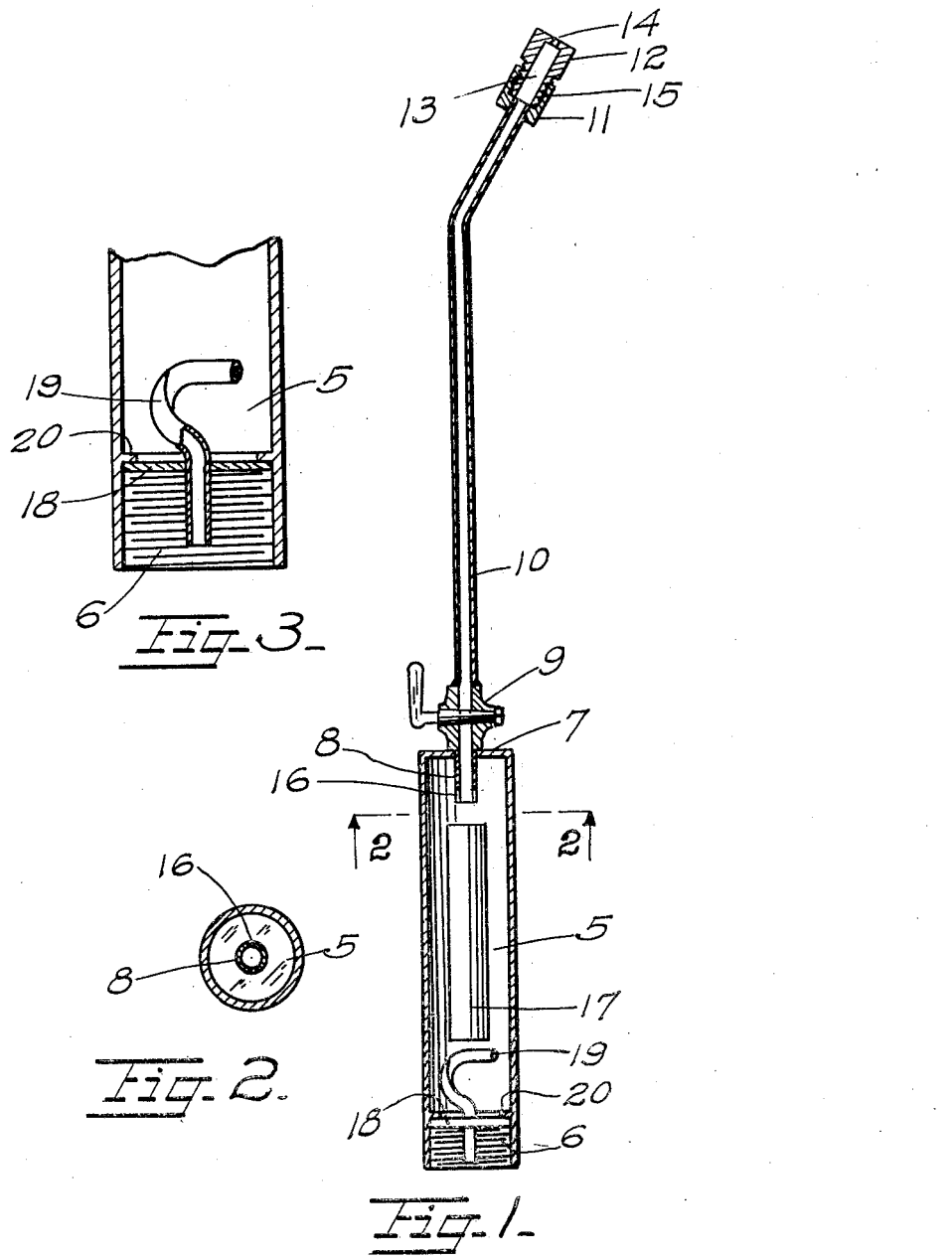

1,875,411

UNITED STATES PATENT OFFICE

ANTON BEEBE, OF EL CERRITO, CALIFORNIA

SPRAY GUN

Application filed September 12, 1930. Serial No. 481,474.

This invention is for a spray gun, and has special reference to a gun for spraying insecticides.

The main object of the invention is to provide a spray gun which may be attached to ordinary garden hose, the liquid supply being obtained from any pressure water supply, the liquid insecticide being formed in a special compartment formed in the handle in which an insecticide in solid form is placed, the water being supplied in swirling motion, the liquid insecticide being projected from a restricted nozzle in the form of a fine spray.

Another object of the invention is to provide a device as outlined which is light in weight, conveniently manipulated and refilled, economically constructed and efficient in its operation and of a size and form conveniently grasped by the hand.

Other objects and advantages of the invention will be readily apparent as the following description is read on the drawing forming a part of this specification.

The invention consists primarily of a cylindrical handle having chamber formed therein and having a tube communicating with and extending from one end, the other end being provided with internal threads and a coiled water delivery tube extending into the chamber for creating a swirling motion of the water and for the purpose of retaining an insecticide cartridge in the chamber.

The tube is provided with a valve adjacent the chamber and is provided at the end with a restricted interchangeable nozzle.

The invention is adequately illustrated in the accompanying drawing in which

Fig. 1 is a sectional longitudinal view through the invention;

Fig. 2 is a section taken on line 2—2 of Fig. 1; and

Fig. 3 is an enlarged section through the water intake end.

Similar reference characters are used to designate similar parts throughout the several views.

The handle has a cylindrical chamber 5 formed therein and is internally threaded at one end as indicated at 6 the other end being closed as at 7 and having a tube 8 fixed therein by any known means, such as hard soldering or brazing, and communicating with the interior of chamber 5.

Communicating with, and affixed to the tube 8 is a valve 9 for controlling the flow of liquid insecticide to the spray tube 10 which is affixed thereto. Affixed to the outer end of tube 10 is an internally threaded coupling 11 into which is threaded a nozzle 12, as at 15, and provided with an internal bore 13 and a restricted aperture 14. The tube 8 is provided with an end slot 16 to permit liquid to flow into the tube should the cartridge 17 lodge against the end of the tube.

A disc 18 is provided with a central coiled tube 19 which is adapted to create a swirling motion to the water, the disc also being adapted to retain a specially prepared cake or cartridge of slowly soluble chemicals 17 within the chamber 5, a shoulder 20 providing a stop for the disc 18.

The threaded end 6 is adapted to receive a hose fitting, or exterior threads may be provided to adapt the device to the ordinary garden hose coupling.

The device is used as follows: The disc 18 is removed and a cartridge of insecticide 17 placed within the chamber 5, the disc 18 replaced and the device coupled onto a flexible tube or hose at 6. Water under pressure is supplied through the hose thence through the coiled tube 19 to the chamber 5 passing about the cartridge 17 in a swirling motion, through tube 8, valve 9, tube 10, and out through the orifice 14 in nozzle 12, the flow being regulated by the valve 9, the flow emerging from the nozzle in a restricted stream which changes to a fine spray, being directed to the desired point of application by the operator.

Having described an operable method of constructing and using the device, it will be understood that variations in design, construction and arrangement of parts which are consistent with the appended claims may be resorted to without detracting from the spirit or scope of the invention or sacrificing any of the advantages thereof.

I claim:

1. A spray gun comprising a cylindrical handle having a chamber formed therein, a rigid tube extending into one end of said chamber and having a transverse groove formed in the end thereof, a removable cartridge retaining disc at the other end of said chamber provided with a coiled inlet tube extending into said chamber and adapted to direct the flow of water tangentially to the walls of the chamber and means for attaching said other end of said handle to a flexible hose or tube.

2. A spray gun comprising a handle having a chamber formed therein, a spray tube extending into one end of said chamber and provided with a transverse slot at the inner end thereof, a slowly soluble insecticide or chemical cartridge disposed in said chamber and spaced from the end by said tube, said slot being adapted to provide solvent action on said cartridge adjacent said slot to prevent closing of the slot by the cartridge, a disc secured in the other end of said chamber, a spiral tube having one end extending through said disc, the spiral portion extending into said chamber whereby a spiral motion is given to the water passing therethrough and means for connecting said other end to a water supply hose.

3. A spray gun comprising a handle having a chamber formed therein, a slowly soluble chemical cartridge disposed in said chamber, a removable plug provided with a coiled inlet tube secured in one end thereof, the coiled portion of said tube being within the chamber and conforming to the walls thereof, a tube extending into and communicating with the other end of said chamber and having a transverse slot formed in the inner end thereof adapted to retain said cartridge in spaced relation to the end of said chamber, said slot being adapted to provide solution of the cartridge actuated by the flow of water through said slot whereby clogging of the slot is obviated.

4. A spray gun comprising a cylindrical handle having a chamber formed therein, a tube extending into one end thereof and provided with a transverse slot in the end thereof adapted to promote solution of the cartridge adjacent thereto whereby clogging of the gun is prevented, the other end of said chamber being threaded to receive a hose coupling, a disc removably retained in said threaded end, a tube extending axially through said disc, the inner portion of said tube being spirally formed to provide spiral motion to the water passing through the gun.

In testimony whereof I have affixed my signature.

ANTON BEEBE.